(12) United States Patent
Meier et al.

(10) Patent No.: US 9,447,874 B2
(45) Date of Patent: Sep. 20, 2016

(54) HYDRAULIC DRIVE

(75) Inventors: Simon Meier, Memmingen (DE);
Thomas Reisch, Altenstadt-Filzingen (DE)

(73) Assignee: LIEBHERR-HYDRAULIKBAGGER GMBH, Kirchdorf/Iller (DE)

( * ) Notice: Subject to any disclaimer, the term of this patent is extended or adjusted under 35 U.S.C. 154(b) by 2227 days.

(21) Appl. No.: 12/485,338

(22) Filed: Jun. 16, 2009

(65) Prior Publication Data

US 2009/0308067 A1    Dec. 17, 2009

(30) Foreign Application Priority Data

Jun. 16, 2008  (DE) .................... 20 2008 008 045 U

(51) Int. Cl.
| *F15B 11/05*   | (2006.01) |
| *F16H 61/4026* | (2010.01) |
| *E02F 9/12*    | (2006.01) |
| *E02F 9/22*    | (2006.01) |
| *F16H 61/4017* | (2010.01) |
| *F16H 61/4035* | (2010.01) |
| *F16H 59/68*   | (2006.01) |

(52) U.S. Cl.
CPC ........... *F16H 61/4026* (2013.01); *E02F 9/123* (2013.01); *E02F 9/2228* (2013.01); *E02F 9/2235* (2013.01); *E02F 9/2296* (2013.01); *F15B 11/05* (2013.01); *F16H 61/4017* (2013.01); *F16H 61/4035* (2013.01); *F15B 2211/20546* (2013.01); *F15B 2211/253* (2013.01); *F15B 2211/40561* (2013.01); *F15B 2211/4159* (2013.01); *F15B 2211/428* (2013.01); *F15B 2211/6054* (2013.01); *F15B 2211/7058* (2013.01); *F16H 2059/6861* (2013.01); *Y10T 137/86493* (2015.04)

(58) Field of Classification Search
CPC ............................................ F15B 2211/40553
USPC ......................................... 91/465, 435, 446
See application file for complete search history.

(56) References Cited

U.S. PATENT DOCUMENTS

| 4,401,009 A | * | 8/1983 | Zeuner et al. | 91/446 |
| 5,138,838 A | * | 8/1992 | Crosser | 91/465 |
| 5,558,004 A | * | 9/1996 | Stellwagen | 91/465 |
| 5,878,647 A | * | 3/1999 | Wilke et al. | 91/446 |

FOREIGN PATENT DOCUMENTS

| DE | 102006040459 | 3/2007 |
| EP | 1609636 | 12/2005 |
| GB | 2285850 | 7/1995 |

* cited by examiner

*Primary Examiner* — F. Daniel Lopez
(74) *Attorney, Agent, or Firm* — Dilworth & Barrese, LLP.

(57) ABSTRACT

The present invention relates to a hydraulic drive which comprises a hydraulic motor having a first hydraulic connector and a second hydraulic connector, wherein the pressure applied at the first hydraulic connector of the hydraulic motor and the pressure applied at the second hydraulic connector of the hydraulic motor are each separately adjustable.

18 Claims, 1 Drawing Sheet

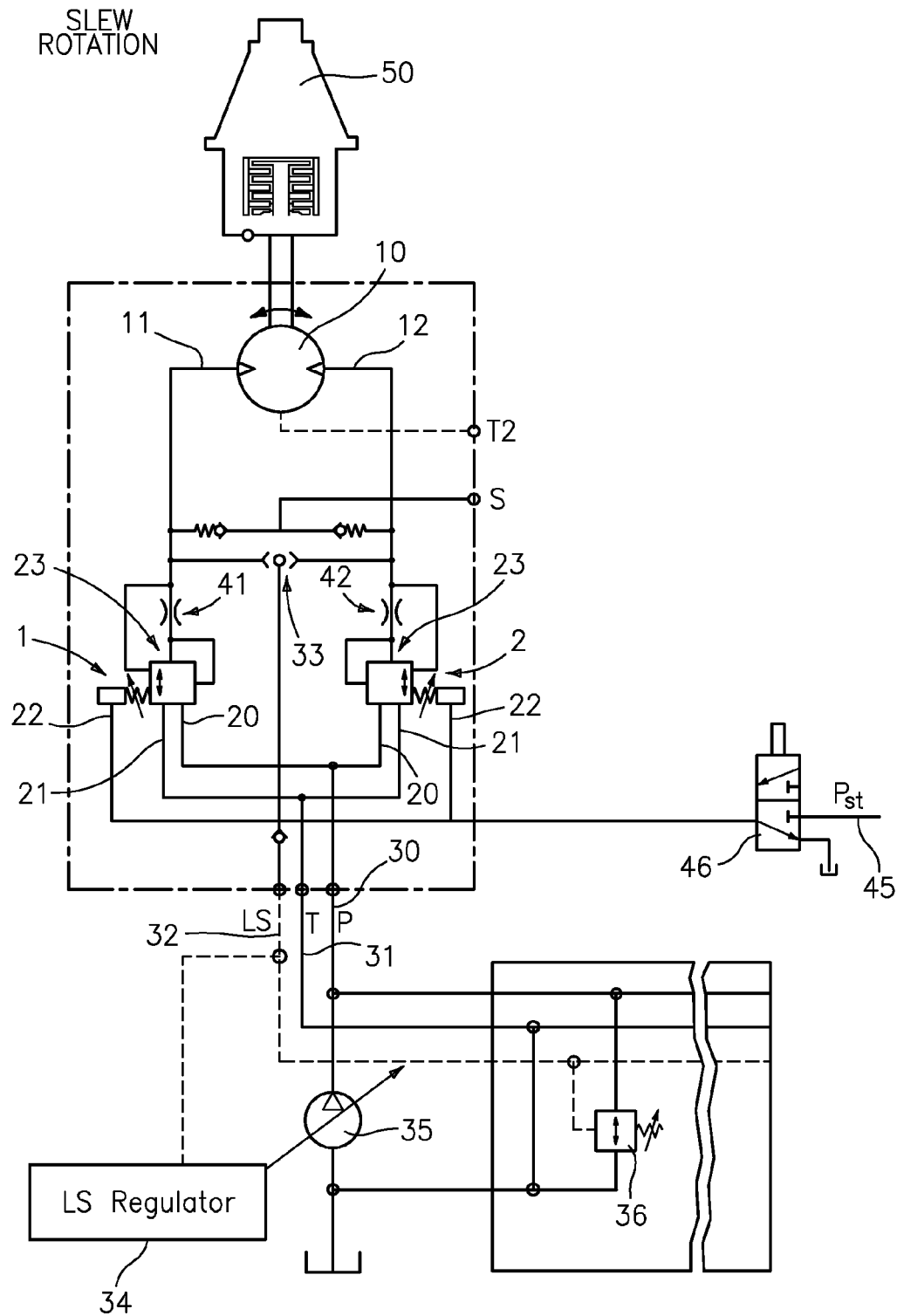

HYDRAULIC DRIVE

BACKGROUND OF THE INVENTION

The present invention relates to a hydraulic drive comprising a hydraulic motor which includes a first hydraulic connector and a second hydraulic connector. Such a hydraulic motor converts hydraulic energy into mechanical energy and is driven in that a pressure difference is applied between the first hydraulic connector and the second hydraulic connector of the hydraulic motor, whereby hydraulic fluid flows through the hydraulic motor. The rotary movement generated by the hydraulic motor is then determined by the displacement volume of the hydraulic motor and by the quantity of the hydraulic fluid flowing through the hydraulic motor.

Previously, essentially the control in an open circuit and the control in a closed circuit have been known for the operation of hydraulic motors. In an open circuit, one of the two hydraulic connectors has pressure applied via a control valve, whereas the other connector is subject to return pressure. A directional valve is provided for directional changes which reverses the assignment of the two hydraulic connectors. In a closed hydraulic circuit, the two hydraulic connectors of the hydraulic motor are, in contrast, directly connected to the hydraulic connectors of a hydraulic pump which hereby directly determines the volume flow through the hydraulic motor.

The disadvantages of an open circuit are in this respect the complicated priority switching, the numerous valves and logic systems which are required for the control and the lack of a precise torque control. The disadvantages of a system having a closed circuit are in particular the high costs since here a separate hydraulic pump has to be provided for each hydraulic motor.

SUMMARY OF THE INVENTION

It is now the object of the present invention to provide a more simple, more flexible and more cost-effective hydraulic drive, in particular a hydraulic drive having a good torque control.

This object is satisfied by a hydraulic drive in accordance with the description herein. It has a hydraulic motor comprising a first hydraulic connector and a second hydraulic connector. Provision is made in accordance with the invention in this respect that the pressure applied at the first hydraulic connector of the hydraulic motor and the pressure applied at the second hydraulic connector of the hydraulic motor can each be set separately. A torque control of the hydraulic drive hereby results which is as simple as it is effective. The pressure difference for the drive of the hydraulic motor can thus be set freely and thus ideally for the respectively desired acceleration or for the braking by the separate control of the pressures applied at the two hydraulic connectors of the hydraulic motor. In addition, the motor can be clamped in with a desired holding pressure in the position of rest.

In this respect, a first pressure reducing valve and a second pressure reducing valve are advantageously provided, with the pressure applied to the first hydraulic connector of the hydraulic motor being adjustable via the first pressure reducing valve and the pressure applied at the second hydraulic connector of the hydraulic motor being adjustable via the second pressure reducing valve. The control in accordance with the invention of the hydraulic motor can be realized simply and cost-effectively by the use of two pressure reducing valves.

In this respect, 3-way valves are advantageously provided as pressure reducing valves. In this respect, provision is in particular advantageously made that the first and second pressure reducing valves each have a connector for working pressure with which they are connected to a pressure supply and a connector for return pressure with which they are connected to a return line, whereby the pressure applied at the respective hydraulic connector of the hydraulic motor is adjustable in the range between the working pressure and the return pressure. Therefore, either hydraulic fluid can flow from the pressure supply to the hydraulic connector of the hydraulic motor or hydraulic fluid can flow off from the hydraulic connector of the hydraulic motor to the return line via each of the two pressure reducing valves. The control in this respect takes place via the pressure reducing valves in each case. The connectors for the working pressure of the first and second pressure reducing valves are in this respect advantageously connected to a common pressure supply; the connectors for the return pressure of the first and second pressure reducing valves to a common return.

A first orifice flowmeter is furthermore advantageously provided which is arranged between the first pressure reducing valve and the first hydraulic connector of the hydraulic motor, and/or a second orifice flowmeter which is arranged between the second pressure reducing valve and the second hydraulic connector of the hydraulic motor, with the pressure drop being determined via the orifice flowmeter and being used for the control of the first and/or second pressure reducing valves. The pressure drop and thus the quantity of the hydraulic fluid flowing to the motor or away from the motor can be measured via the orifice flowmeters and can be limited or set via the pressure reducing valves.

The pressure reducing valves are in this respect advantageously controllable hydraulically or electrically. If the pressure reducing valves are controllable hydraulically, they accordingly have a control input to which a control pressure can be applied.

The hydraulic drive in accordance with the invention furthermore advantageously comprises a hydraulic pump for the provision of the working pressure as the pressure supply.

A load-sensing connector is furthermore advantageously provided which is connected to the first hydraulic connector and to the second hydraulic connector of the hydraulic motor via check valves. The system can be integrated into a load-sensing system via such a load-sensing connector and can thus be operated via a load-sensing variable delivery pump.

A load-sensing regulator is furthermore advantageously provided in this respect whose control input is connected to the load-sensing connector, with the load-sensing regulator regulating a hydraulic pump which, as a pressure supply, provides the working pressure.

If the pressure reducing valves are electrically controlled, the system in accordance with the invention can also be operated with an electrically adjustable pump.

With a hydraulic control of the pressure reducing valves, in contrast, a pre-control for the pressure reducing valves is advantageously provided via which a safety deactivation is advantageously realized.

The present invention furthermore comprises a piece of working equipment, in particular a piece of mobile working equipment, in particular a hydraulic excavator, having a hydraulic drive, as was described above. The hydraulic drive can in this respect be used for the drive of different components of the piece of working equipment and permits a torque control which is as simple as it is effective.

The piece of working equipment advantageously comprises an undercarriage in this respect and a superstructure arranged rotatable around a vertical axis of rotation on the undercarriage, with the hydraulic motor of the hydraulic drive in accordance with the invention serving as slewing gear for the superstructure.

BRIEF DESCRIPTION OF THE DRAWING

The present invention will now be presented in more detail with reference to an embodiment and to a drawing. There are shown:

FIG. 1. the embodiment of the hydraulic drive in accordance with the invention for the drive of slewing gear of a hydraulic excavator.

DESCRIPTION OF THE PREFERRED EMBODIMENT

FIG. 1 shows an embodiment of the hydraulic drive in accordance with the invention comprising a hydraulic motor 10 which includes a first hydraulic connector 11 and a second hydraulic connector 12. The hydraulic motor is a fixed displacement motor having two directions of rotation. The hydraulic motor 10 is driven in this connection in that a pressure difference is applied between the first hydraulic connector and the second hydraulic connector, with the rotary movement of the hydraulic motor being determined by the quantity of hydraulic fluid flowing through the hydraulic motor and its displacement volume.

In accordance with the invention, the pressure applied at the first hydraulic connector 11 of the hydraulic motor 10 and the pressure applied at the second hydraulic connector 12 of the hydraulic motor 10 can now be set separately. For this purpose, a first pressure reducing valve 1 and a second pressure reducing valve 2 are provided, with the output 23 of the first pressure reducing valve 1 being connected to the first hydraulic connector 11 and the output 23 of the second pressure reducing valve 2 being connected to the second hydraulic connector 12 of the hydraulic motor. The pressure applied at the hydraulic connector 11 can hereby be set via the pressure reducing valve 1 and the pressure applied at the second hydraulic connector 12 can be set via the second pressure reducing valve 2.

The hydraulic motor 10 in the embodiment serves the drive of the slewing gear 50 of a movable piece of working equipment, in particular of a hydraulic excavator. The pivot pressure can be set freely and thus ideally for the acceleration and braking respectively via the pressure reducing valves 1 and 2. In the position of rest, the hydraulic motor 10 can moreover be clamped at a desired holding pressure.

The pressure reducing valves 1 and 2 are in this respect 3-way valves which each have a connector 20 for the working pressure, a connector 21 for the return pressure as well as the output connected to the respective hydraulic connector of the hydraulic motor. The connectors 20 for the working pressure of the first and second pressure reducing valves are in this respect connected to a common pressure supply; the connectors 21 for the return pressure to a common return. For this purpose, a common pressure supply connector 30 as well as a common return connector 31 are provided.

Furthermore, an orifice flowmeter 41 is provided for the first pressure reducing valve which is arranged between the output 23 of the first pressure reducing valve 1 and the first hydraulic connector 11 of the hydraulic motor and a second orifice flowmeter 42 is provided for the second pressure reducing valve which is arranged between the output 23 of the second pressure reducing valve 2 and the second hydraulic connector 12 of the hydraulic motor. The pressure drop and thus the quantity of the hydraulic fluid flowing to the motor or flowing off from the motor can be measured via these orifice flowmeters 41 and 42 and can be set via the pressure reducing valves 1 and 2.

In the embodiment, the pressure reducing valves are controlled hydraulically, for which purpose they have hydraulic control connectors 22. The hydraulic control connectors of the two pressure reducing valves 1 and 2 are in this respect connected to control line 45, drawn only schematically, for the control pressure. A pre-control is furthermore provided in the control line 45 via which the pressure reducing valves 1 and 2 are pre-controlled. In this respect, a safety valve 46 is provided which realizes a safety deactivation for the motor. Alternatively, the pressure reducing valves 1 and 2 could also be electrically controlled.

The setting of the pressure applied at the hydraulic connectors 11 and 12 of the hydraulic motor is carried out by the pressure reducing valves 1 and 2 in that either the connector 20 for the working pressure or the connector 21 for the return pressure are connected to the output 23 of the pressure reducing valve. Hydraulic fluid can hereby either flow from the pressure supply to the hydraulic motor or hydraulic fluid can hereby flow off from the hydraulic motor to the return line. The quantity of hydraulic fluid flowing through the hydraulic motor can thus also be controlled by a corresponding control.

Furthermore, a load-sensing connection is provided which is connected via check valves 33 to the two hydraulic connectors 11 and 12 of the hydraulic motor 10. The system can thus be integrated into a load-sensing system via the load-sensing connector 32 and can thus be operated via a load-sensing variable delivery pump 35, for which purpose the load-sensing regulator 34 is provided via which the variable delivery pump 35 is adjusted. A valve 36 is furthermore provided for the setting of the working pressure. Alternatively, with electrically controlled pressure reducing valves 1 and 2, an electrically adjustable pump can also be used.

The hydraulic drive in accordance with the invention is used as a stewing gear drive in the embodiment. A superstructure arranged rotatably on an undercarriage can thus be rotated via the slewing gear drive. With movable pieces of working equipment, the traveling gear is usually arranged at the undercarriage and the piece of working equipment, e.g. an arm, at the superstructure. With a hydraulic excavator, a shovel is accordingly arranged at the arm.

The hydraulic drive in accordance with the invention in this connection permits a torque control which is as simple as it is effective and which can be realized cost-effectively. Alternatively to the slewing gear drive shown, the hydraulic drive in accordance with the invention can also be used for other drive tasks for which a drive motor is required. The use of the hydraulic drive in accordance with the invention is e.g. also conceivable for the drive of a winch in cranes.

The invention claimed is:

1. A hydraulic drive which comprises a hydraulic motor having a first hydraulic connector and a second hydraulic connector, wherein the pressure applied at the first hydraulic connector of the hydraulic motor and the pressure applied at the second hydraulic connector of the hydraulic motor are each separately adjustable; and further comprising:
a first pressure reducing valve for varying the pressure applied to the first hydraulic connector between a working pressure and a return pressure;
a second pressure reducing valve for varying the pressure applied to the second hydraulic connector between a working pressure and a return pressure;
a first orifice flowmeter arranged between the first pressure reducing valve and the first hydraulic connector of the hydraulic motor; and
a second orifice flowmeter arranged between the second pressure reducing valve and the second hydraulic connector of the hydraulic motor,
wherein a pressure drop is determined via the first orifice flowmeter and is used to control the first pressure reducing valve and a pressure drop is determined via the second orifice flowmeter and is used to control the second pressure reducing valve.

2. A hydraulic drive in accordance with claim 1, wherein the pressure applied at the first hydraulic connector of the hydraulic motor is adjustable via the first pressure reducing valve and the pressure applied at the second hydraulic connector of the hydraulic motor is adjustable via the second pressure reducing valve.

3. A hydraulic drive in accordance with claim 2, wherein the first and second pressure reducing valves each have a connector for working pressure with which they are connected to a pressure supply and a connector for return pressure with which they are connected to a return line, whereby the pressure applied at the respective hydraulic connector of the hydraulic motor is adjustable in the range between the working pressure and the return pressure.

4. A hydraulic drive in accordance with claim 3, wherein the pressure reducing valves are hydraulically or electrically controllable.

5. A hydraulic drive in accordance with claim 4, having a hydraulic pump, as the pressure supply, for the provision of the working pressure.

6. A hydraulic drive in accordance with claim 3, wherein the pressure reducing valves are hydraulically or electrically controllable.

7. A hydraulic drive in accordance with claim 6, having a hydraulic pump, as the pressure supply, for the provision of the working pressure.

8. A hydraulic drive in accordance with claim 2, wherein the pressure reducing valves are hydraulically or electrically controllable.

9. A hydraulic drive in accordance with claim 8, having a hydraulic pump, as the pressure supply, for the provision of the working pressure.

10. A hydraulic drive in accordance with claim 1, wherein the first and second pressure reducing valves are hydraulically or electrically controllable.

11. A hydraulic drive in accordance with claim 1, having a hydraulic pump, as a pressure supply, for the provision of the working pressure.

12. A hydraulic drive in accordance with claim 1, wherein a load-sensing connector is provided which is connected via check valves to the first and second hydraulic connectors of the hydraulic motor.

13. A hydraulic drive in accordance with claim 12, having a load-sensing regulator whose control input is connected to the load-sensing connector, wherein the load-sensing regulator regulates a hydraulic pump which, as a pressure supply, provides the working pressure.

14. A hydraulic drive in accordance with claim 1, having a pre-control for the pressure reducing valves via which a safety deactivation is advantageously realized.

15. A combination of a piece of working equipment and a hydraulic drive in accordance with claim 1.

16. A piece of working equipment in accordance with claim 15, having an undercarriage and a superstructure arranged rotatably around a vertical axis of rotation on the undercarriage, wherein the hydraulic motor serves as slewing gear for the superstructure.

17. A hydraulic drive in accordance with claim 1, wherein the pressure reducing valves are hydraulically or electrically controllable.

18. A hydraulic drive in accordance with claim 6, having a hydraulic pump, as the pressure supply, for the provision of the working pressure.

* * * * *